United States Patent
Tuomi

(10) Patent No.: US 8,294,731 B2
(45) Date of Patent: Oct. 23, 2012

(54) BUFFER MANAGEMENT IN VECTOR GRAPHICS HARDWARE

(75) Inventor: Mika Tuomi, Soormarkku (FI)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1039 days.

(21) Appl. No.: 11/272,867

(22) Filed: Nov. 15, 2005

(65) Prior Publication Data
US 2007/0109309 A1   May 17, 2007

(51) Int. Cl.
*G09G 5/00* (2006.01)
(52) U.S. Cl. .......................... 345/613; 345/536
(58) Field of Classification Search .................. 345/613, 345/536
See application file for complete search history.

(56) References Cited

U.S. PATENT DOCUMENTS

| | | | | |
|---|---|---|---|---|
| 4,918,626 | A * | 4/1990 | Watkins et al. | 345/421 |
| 5,461,706 | A * | 10/1995 | Trow et al. | 345/585 |
| 5,929,862 | A * | 7/1999 | Barkans | 345/613 |
| 5,940,088 | A * | 8/1999 | Hsu | 345/556 |
| 6,002,385 | A * | 12/1999 | Silverbrook | 345/100 |
| 6,141,020 | A * | 10/2000 | Larson | 345/501 |
| 6,317,525 | B1 * | 11/2001 | Aleksic et al. | 382/299 |
| 6,473,522 | B1 * | 10/2002 | Lienhart et al. | 382/168 |
| 6,614,444 | B1 * | 9/2003 | Duluk et al. | 345/581 |
| 6,870,543 | B1 * | 3/2005 | Eitzmann | 345/545 |
| 6,919,908 | B2 * | 7/2005 | Munshi et al. | 345/620 |
| 6,937,244 | B2 * | 8/2005 | Hong | 345/544 |
| 7,006,110 | B2 | 2/2006 | Crisu et al. | |
| 7,173,631 | B2 * | 2/2007 | Anderson | 345/611 |
| 7,292,256 | B2 | 11/2007 | Lawther et al. | |
| 2002/0085010 | A1 | 7/2002 | McCormack et al. | |
| 2003/0122829 | A1 * | 7/2003 | McNamara et al. | 345/441 |
| 2003/0179200 | A1 * | 9/2003 | Martin et al. | 345/428 |
| 2003/0214506 | A1 | 11/2003 | Koselj et al. | |
| 2003/0218614 | A1 * | 11/2003 | Lavelle et al. | 345/539 |
| 2004/0001069 | A1 | 1/2004 | Snyder et al. | |
| 2004/0227767 | A1 | 11/2004 | Baroncelli et al. | |
| 2005/0024512 | A1 * | 2/2005 | Moini et al. | 348/294 |
| 2005/0035976 | A1 * | 2/2005 | Ecob et al. | 345/611 |
| 2005/0036039 | A1 * | 2/2005 | Silverbrook et al. | 348/222.1 |
| 2005/0067498 | A1 | 3/2005 | Smith | |

(Continued)

FOREIGN PATENT DOCUMENTS
WO   94/29812   12/1994
(Continued)

OTHER PUBLICATIONS
International Search Report, PCT/FI2006/000376, Date May 8, 2007.
(Continued)

*Primary Examiner* — Maurice L McDowell, Jr.
(74) *Attorney, Agent, or Firm* — Faegre Baker Daniels LLP

(57) ABSTRACT

A graphics processor or a graphics block for use in a processor includes a type buffer used for determining if a currently processed pixel requires further processing. Each pixel has a number of sub-pixels and each sub-pixel line includes at least one counter that is stored in an edge buffer. A limited edge buffer that can store edge buffer values in a limited range can be employed. Each buffer can include information regarding the whole screen or a portion of thereof. The edge buffer also can be an external or internal buffer, and when implemented internally, the graphics processor or graphics block need not employ a bi-directional bus.

23 Claims, 2 Drawing Sheets

U.S. PATENT DOCUMENTS

| | | |
|---|---|---|
| 2006/0103658 A1* | 5/2006 | Liao .............................. 345/545 |
| 2006/0103665 A1 | 5/2006 | Opala et al. |
| 2006/0129914 A1* | 6/2006 | Ellis et al. .................... 715/504 |
| 2008/0012878 A1* | 1/2008 | Nystad et al. ................ 345/613 |

FOREIGN PATENT DOCUMENTS

| | | |
|---|---|---|
| WO | 01/80183 A1 | 10/2001 |
| WO | WO 03/096275 | 11/2003 |

OTHER PUBLICATIONS

Daniel Rice; "Open VG Specification Version 1.0"; Sun Microsystems, Inc.; Jul. 28, 2005; pp. 1-178.

EP Supplemental Search Report; EP Application No. 06820057.5; dated Aug. 22, 2011.

"C variable types and declarations"; from en.wikipedia.org; Oct. 8, 2005.

* cited by examiner

BUFFER MANAGEMENT IN VECTOR GRAPHICS HARDWARE

CROSS REFERENCE TO RELATED DOCUMENTS

The present invention is related to concurrently filed U.S. patent application Ser. No. 11/272,866, entitled "VECTOR GRAPHICS ANTI-ALIASING," the entire disclosure of which is hereby incorporated by reference herein.

BACKGROUND OF THE INVENTION

1. Field of the Invention

The present invention generally relates to buffer management, and more particularly to buffer management in vector graphics hardware.

2. Discussion of the Background

In recent years, vector graphics systems and algorithms have been developed for achieving robust and exact visualization, and have been employed in demanding software applications, such as in computer aided design, graphics applications, and the like. The benefit of the employing vector graphics, include scalability without the loss of graphics quality. The vector in a drawing or a plan typically includes a starting point, a direction, and a length or an ending point. Thus, a line can be represented using vector graphics with reduced information, as compared to having to indicate each pixel of the line, as with other methods. Furthermore, the vector need not be a direct line, as curves, and the like, also can be employed, and including additional information, for example, for defining a curve. The corresponding format employed during the execution of a corresponding graphical application, the file format for storing the corresponding graphical information, the fundamentals of vector graphics and the corresponding software applications employed, and the like, are well known and will not be described in detail herein.

In addition, certain graphics standards have been developed, such the OpenVG 1.0 standard by Khronos group of Jul. 28, 2005, incorporated by reference herein, and which includes an application programming interface (API) for hardware accelerated two-dimensional vector and raster graphics applications. The standard provides a device independent and vendor-neutral interface for sophisticated two-dimensional graphical applications, while allowing device manufacturers to provide hardware acceleration on devices ranging from wrist watches, to full microprocessor-based desktop systems, to server machines, and the like.

The standard provides an interface for a set of functions that can be implemented by hardware and/or software drivers for rasterization, filling of polygons, and the like. In the standard, two different fill rules, a non-zero and an odd/even rule, are implemented, and are described at page 72 of the standard. The basic principle of such filling technique employs the fact that each edge of a polygon has a direction, such that when the filling procedure arrives at the edge from the left, the filling procedure detects if the edge is going up or down. If the edge is going upwards, a counter is increased, and if the edge is going downwards, the counter is decreased. The value of the counter is stored in a buffer for each pixel on the screen. However, the pixels are further divided into sub-pixels, wherein the counter values must be stored for each line of each sub-pixel, requiring even larger buffers.

The above technique presents a problem for compact hardware implementations, and the like, and which may limit the buffer size, for example, due to manufacturing considerations, cost considerations, and the like. For example, if a mobile device has a display resolution of 176×208 pixels, and each pixel is divided into 16×16 sub-pixels, and an 8-bit counter is employed for each line, a buffer of 585728 bytes is needed. However, a buffer of such size may not be practical for integration on a graphics hardware accelerator of such a mobile device. Furthermore, merely adding more memory to the graphics hardware accelerator may not be practical, for example, due to the common evolvement in manufacturing processes, a need for bigger graphics resolutions, and the like.

One solution is to use the main memory of the device for implementing the above-noted buffer. However, such a solution results in increased traffic on limited bandwidth buses between the graphics accelerator and the main memory.

SUMMARY OF THE INVENTION

Therefore, there is a need for decreasing traffic on buses between a main memory, and a graphics accelerator, as described above. The above and other problems are addressed by the exemplary embodiments of the present invention, which provide an exemplary hardware implemented vector graphics solution. The exemplary embodiments can be employed with various graphical applications, including computer graphics applications, and the like, and in particular handheld device applications, low computing capacity device applications, memory limited device applications, and the like.

Accordingly, in exemplary embodiments of the present invention there are provided a graphics processor, a graphics processing unit, a functional block for a graphics processor, a graphics device, and the like, for processing vector graphics primitives, and the like. The exemplary embodiments can include counters for storing a value indicating a current state of a fill rule for each of a sub-pixel sampling point. The counter values are stored in a memory that can be an internal memory of the graphics processor or an external memory, for example, a conventional memory of a device. The exemplary embodiments further can include a bus for receiving instructions and primitives. If the memory is an internal memory, the bus is unidirectional, and if the memory is external, the bus is bi-directional for transmitting requests to the memory. Accordingly, the memory is used for storing the values of each of the counters.

The exemplary embodiments further can include a first internal buffer arranged to store at least one indicator bit value for each pixel. Typically, the internal buffer has values having a length of one or two bits. However, different bit lengths can be employed, as needed. The exemplary embodiments further can include determination logic arranged to determine whether or not to retrieve a counter value from the memory based on the indicator bit values. The indicator bits of the first buffer include a value for indicating that a value of a counter has not changed. Furthermore, the indicator bits of the first buffer include a value for indicating that a value of a counter has to be retrieved from the memory, which can be internal or external, depending on a given implementation, as described above.

The exemplary embodiments can include a second internal buffer arranged to store limited values for each counter, and the determination logic can be further arranged to determine whether or not to retrieve the counter value from the second buffer. The indicator bits of the first buffer further can include values for indicating a range of the second buffer from which the limited value of each counter can be retrieved.

In an exemplary embodiment, polygons can be processed in tiles, wherein, advantageously, the internal memories employed need not be allocated for the whole screen, but rather a portion thereof. The tile size can be, for example, 32×32 pixels. In further exemplary embodiments such a size can be chosen depending on a given implementation, and various other hardware architectures can be employed for the internal memory, the internal buffers, and the like, as will be appreciated by those skilled in the hardware art(s).

Advantageously, the exemplary embodiments can be employed to reduce traffic in a bus between a graphics accelerator and an external main memory, by employing the internal memory in the graphics processor, and which is faster than the external main memory that is addressed over the bus. As the exemplary embodiments include the counter information in the first or the second buffers internal to the graphics processor, advantageously, the main memory need not be addressed for every pixel, resulting in a solution that is beneficial and faster than conventional approaches to solving the above-noted problem. Furthermore, with the exemplary embodiments, the first buffer and the second buffer can be reduced in size, advantageously, allowing integration thereof in a graphics processor, and resulting in minimizing of manufacturing costs.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
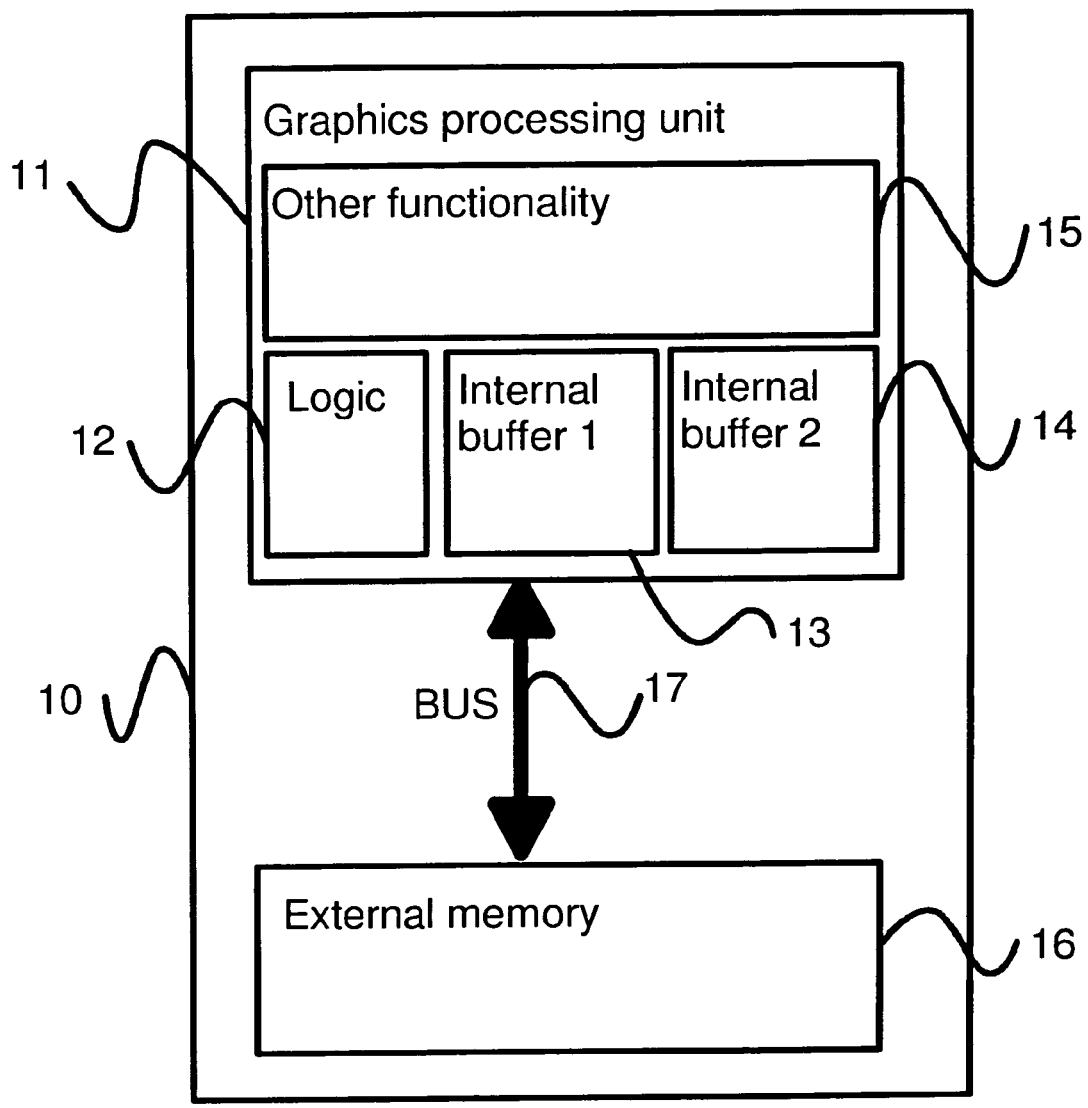
FIG. 1 illustrates an exemplary graphical device, according to the present invention.
Figure 2:
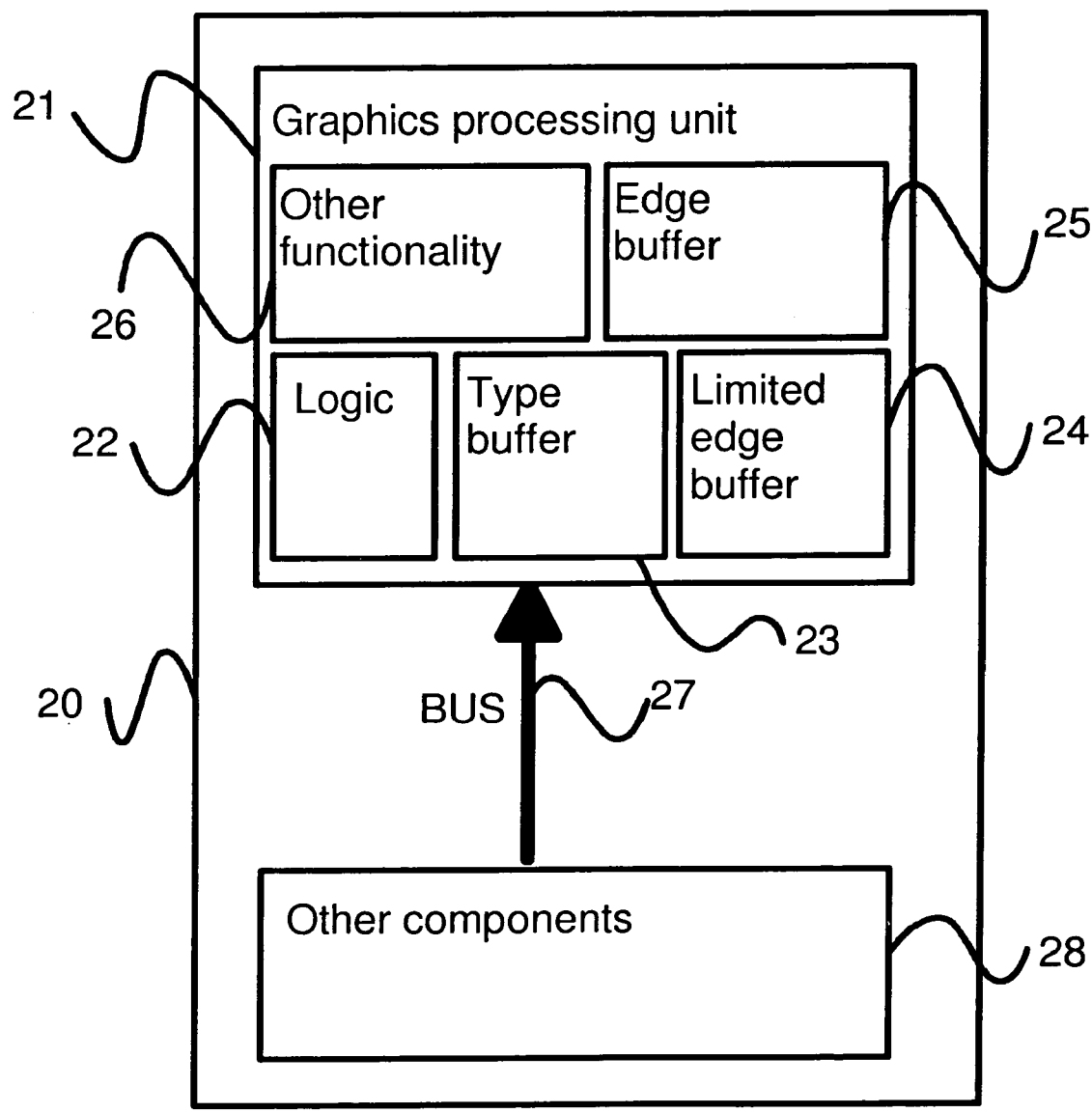
FIG. 2 illustrates a further exemplary graphical device, according to the present invention.

Referring now to the drawings, wherein like reference numerals designate identical or corresponding parts throughout the several views, and more particularly to FIGS. 1 and 2 thereof, there are illustrated exemplary graphical devices, according to exemplary embodiments. As will be appreciated by those skilled in the hardware art(s), the bit values and data type lengths employed in the exemplary embodiments are for exemplary purposes, and in further exemplary embodiments can be selected, for example, depending on the overall design of the corresponding graphics module, and the like. In an exemplary embodiment, the exemplary graphics module can be part of a graphics processor unit, which can be a part of a graphics card, and the like. In further exemplary embodiments, for example, such in embedded system applications, and the like, the graphics processor unit can include further functionality for producing graphics, and the like. Thus, a graphics processor unit according to further exemplary embodiments can include further functionality in addition to the functionality of the exemplary embodiments.

In FIG. 1, the exemplary graphical device 10 can include, for example, a mobile telephone, a video graphics card, and the like, and, thus, can include further components that need not be described with respect to the exemplary embodiments, but which can be employed for a given application. The exemplary embodiments, for example, can be implemented in a graphics processor unit 11, and the like, and which can include other functionality 15 that need not be described with respect to the exemplary embodiments, but which can be configured for a given application. The exemplary embodiments can be implemented via logic 12 (e.g., configured to determine whether or not to retrieve and to retrieve counter value from a memory based on indicator bit values), and internal buffers 13 and 14. Furthermore, an external memory 16 connected via a bus 17 can be employed, as shown in FIG. 1. However, the external memory 16 need not be employed, for example, if the exemplary embodiments are implemented in an internal memory of a graphics processor. If the external memory 16 is employed, a bi-directional bus 17 can be provided, as shown in FIG. 1. Otherwise, a unidirectional bus can be employed. In addition, other components in the graphics processing unit 11 may employ a bi-directional bus or unidirectional bus, as needed.

The exemplary embodiments are based on an exemplary architecture, which can include three different memory areas that are employed for storing the information for producing a graphical image. The first memory area, which is referred to as an edge buffer 25, can include the complete information for the previously described filling operation. Each pixel includes sub-pixels that typically have a sampling point on each sub-pixel line. Thus, the allocated memory depends on the chosen resolution for each corresponding parameter. For example, for an actual screen resolution of 176×208 pixels, as is common for current mobile phone applications, and the like, each pixel is divided into 16×16 sub-pixels, with each sub-pixel line employing a corresponding 8-bit counter, resulting in a memory allocation of 585,728 bytes for the corresponding counters. The counters are used in the above-noted filling technique, and are employed because the complete information may not be available. The corresponding 585,728 bytes of memory can be configured as an internal or an external memory. However, it may not possible to manufacture such a memory as an internal memory, for example, because of manufacturing costs, and the like, and in which case an external memory can be employed and accessed with a bi-directional bus for requesting a value for each counter value when necessary, as shown in FIG. 1.

The two other memories according to the exemplary embodiments include internal buffers 13 and 14, wherein the first internal buffer 13 can be configured as a type buffer 23, and the second internal buffer 14 can be configured as a limited edge buffer 24, for example, when there are no changes in filling rules for each pixel or sub-pixel. Thus, with the exemplary embodiments, advantageously, requests to the external memory can be avoided, minimized, and the like.

In an exemplary embodiment, the first internal buffer 13 can be configured to have a resolution of two bits for each pixel. Thus, the corresponding memory allocation employed is 176×208/4 bytes, which equals 9,152 bytes, and which is considerably less than that needed for implementing a complete edge buffer 25. The exemplary values for the type buffer 23 can include and indicate, for example:

00=No information
01=Limited edge buffer, range −1 . . . 2
10=Limited edge buffer, range −2 . . . 1
11=edge buffer in the external memory The exemplary values indicate from where the filling information for each pixel can be retrieved. For example, a value of 00 can indicate that there is no information available for the current pixels, which means that the state of the filling rule does not change on a current pixel. Thus, no further processing need be performed, as all of the counters have the same values as in the previous pixel. Values 01 and 10 can be used to indicate that information is stored in the second internal buffer 14, which can be a limited edge buffer 24. The significance of the corresponding ranges is further described below with respect to the second internal buffer 14. The value 11 indicates that the counter value cannot be stored in the limited edge buffer 24, but rather can be retrieved from the complete edge buffer 25. According to the exemplary embodiments, the first internal buffer 13 is processed first. Thus, to clear the buffers, each value in the first internal buffer 13 can be set to 00. While computing the edge information, the first internal buffer 13 can be modified, for example, only when information is to be stored to the other buffers. Thus, outdated information stored into other buffers is not accessed, when the value of the type buffer 23 is set to 00.

As the counters are assigned for each line of sub-pixels, the second internal buffer 14 includes more information, because there are 16 counters for each pixel. In an exemplary embodiment, the information in the second internal buffer 14 also has a length of two bits, but it is assigned for each sub-pixel sampling point. Thus, each pixel has 32-bits of information, for an implementation employing a 16×16 resolution. Advantageously, a 32-bit length can be covered with a single double word. However, in further exemplary embodiments, any suitable length, for example, depending on a given application can be employed, as will be appreciated by those skilled in the hardware art(s). In the current example, the second internal buffer 14 employs 146,432 bytes, and which is considerably less than that needed for the complete information.

With the exemplary embodiments, as two bits of information can be employed for the values 01 and 10, four different numbers can be represented. In addition, as the information can be signed, the possibilities for the values 01 and 10 can include −1 . . . +2, and −2 . . . +1, respectively. The selection of such a range can be indicated in the type buffer 23, wherein in most cases, such a range is sufficient for covering the changes within one pixel, advantageously, reducing accesses to the complete edge buffer 25. In an exemplary embodiment, the range can be different for different pixels, but within one pixel a single range can be applied. Thus, if either of the ranges is not acceptable, the type buffer 23 can be set to a value indicating that the counter value can be retrieved from the complete edge buffer 25.

According to the exemplary embodiments, data lengths can vary depending on a given application. However, if the type buffer 23, which is the first internal buffer 13, has a data length of one bit, such implementation need not employ the second internal buffer 14. In this case, the type buffer 23 need only indicate if the counter value has to be retrieved from an edge buffer that is stored in the external memory 16. Such implementation is possible, but is not as efficient as the implementation of the example described above. However, such implementation may be employed and may be desirable, for example, if it is not possible to provide sufficient internal memory. In addition, the memory demand for the one-bit type buffer 23 implementation is one half that of the two-bit implementation.

In FIG. 2, the exemplary graphics device 20 can include a graphics processing unit 21. In an exemplary embodiment, the screen can be processed in tiles, wherein, advantageously, the corresponding memory and internal buffers need not be allocated for the whole screen resolution. If the memory is an external memory, it can be allocated for the whole screen. Advantageously, with the tiled implementation, the corresponding memory can be an internal memory, due to a reduced need for memory size. Such an internal memory can be used for storing the complete edge buffer 25 for the whole tile. For example, if a 32×32 pixel tile is used, there can be employed 16,384 bytes for the complete edge buffer 25. If the type buffer 23, which is the first internal buffer 13, has 2-bit values, there can be employed 256 bytes for the type buffer 23. If the limited edge buffer 24, which is the second internal buffer 14, is employed and has 2-bit values for each sub-pixel line, there can be employed 4,096 bytes for the limited edge buffer 24. If the limited edge buffer 24 is not employed and the type buffer 23 has 1-bit values, the type buffer 23 need only employ 128 bytes. Advantageously, the memory employed can be adjusted by choosing the tile size without losing the resolution of the values in the buffers. When the type buffer 23, the edge buffer 25, and possibly the limited edge buffer 24 are stored internal to the graphics processing unit 21, the bus 27 can be configured as a unidirectional bus. The bus 27 can configured for receiving instructions and data from other components 28, such as CPU, main memory, and the like. The logic 22 and the other functionality 26 can function as in the exemplary embodiments of FIG. 1. In addition to tiles, in further exemplary embodiments, the screen can be divided into parts or in other ways, can by processed by scan lines, and the like, as will be appreciated by those skilled in the hardware art(s).

Although the exemplary embodiments are described in terms of implementation as part of a graphics processor unit, the exemplary embodiments can be implemented as a graphics block included in any suitable processor unit, and the like, as will be appreciated by those skilled in the hardware art(s). The novel aspects of the exemplary embodiments include the logic 22, the type buffer 23, and the edge buffer 25, but may further include the limited edge buffer 24, and the like. The remaining components, for example, such as the bus 27, and the like, can depend on the needs of a given host processor. Advantageously, the exemplary embodiments need not employ a bi-directional bus, even though busses typically are bi-directional in general-purpose processors, graphics processors, and the like.

In the tiled exemplary embodiment, the processor unit or graphics block 21 can be configured to process the screen tile by tile. Once a tile is processed, it need not be further employed and can be discarded. Advantageously, the respective tile memory can be re-used by clearing the type buffer 23. As only the data related to the currently processed tile is known, in an exemplary embodiment, appropriate rules can be employed, for example, for controlling the information related to adjacent tiles, and the like. For example, in a typical drawing process, operating from left to right, a currently processed tile can employ information from the left neighbor tile, and may pass information to the right neighbor tile.

In an exemplary embodiment, the processing of the complete image can be started from the left. Thus, the first case to be handled is a situation wherein a polygon is not completely in view, but rather is partially out on the left side. In this situation, the portion of the edge exceeding the left border is forced to the left border. If the whole edge is outside the leftmost tile, the complete edge can be forced to the left border of the tile. When the edge is forced to the left border, each of the counters can be changed to produce an image rendered correctly in the visible part of the polygon. Without such forcing, some of the counters would not be changed and this would cause a situation, wherein a part of the pixel would be interpreted as being within the polygon, while another part of the pixel would be interpreted as being outside the polygon. Since the fill rule works cumulatively, all of the counter values in the same horizontal line before the currently processed counter value may need to be known. Thus, the values outside the image can be computed in the left border. The leftmost border can be computed in a similar manner, even if the tiled embodiment is not employed.

When the first tile has been processed, the data affecting the second tile can be transferred to the second tile, in various different ways, as will be appreciated by those skilled in the hardware art(s). For example, counters can be employed for passing the values of the sub-pixel counters to the next tile. However, if an edge crosses a sub-pixel so that it is not considered to be within the pixel, the result will not be correct in the next pixel, if this is not taken into account. Thus, when the tile is not the leftmost tile, the edges also can be computed one pixel to the left from the tile currently being processed. In this case, the edges are not forced on the left border, as with the leftmost tile.

Similarly, the corresponding information is transferred to the next tile, until the rightmost tile is reached. In the rightmost tile, the information needs to be received from the previous tile, as previously described. However, such information need not be transferred further, as the rest of the edges are out of view. When the rightmost tile has been processed, the rendering moves to the next tile line, and starts from the leftmost tile, as described above. This process can be repeated until the rightmost tile of the last tile line has been processed. At this stage, the current polygon is considered processed, and the above processing can be repeated with the next polygon, until all of the polygons have been processed.

The exemplary embodiments can receive the edges from an edge feeder component, configured to send all of the edges that hit on the screen or tile, as will be appreciated by those skilled in the hardware art(s). In addition, in the case of the leftmost tile or complete screen implementation, the edges to the left of the present tile also can be sent, as will be appreciated by those skilled in the hardware art(s).

The exemplary embodiments can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. An apparatus for processing vector graphics primitives, the apparatus comprising:
a processor unit comprising:
counters configured to store a value indicating a current state of a fill rule for each of a sub-pixel sampling point for a pixel;
a first internal buffer configured to store at least one indicator bit value for each pixel, wherein said at least one indicator bit indicates status of the counters indicating the state of the fill rule and indicates whether to retrieve limited counter values from a second buffer or complete counter values from an external memory; and
determination logic configured to determine whether or not to retrieve and to retrieve the counter value from the external memory or the second buffer based on the indicator bit values;
the apparatus further comprising a bus operatively coupled to the processor unit and the external memory.

2. The apparatus of claim 1,
wherein the second buffer is an internal buffer configured to store limited values for each counter, and the determination logic is further configured to determine whether or not to retrieve the limited counter values from the second buffer.

3. The apparatus of claim 2, wherein the indicator bits of the first internal buffer include a value for indicating that a value of the counter has not changed.

4. The apparatus of claim 2, wherein the indicator bits of the first buffer include values for indicating a range of the second internal buffer from which the limited value of each counter is retrieved.

5. The apparatus of claim 1, further comprising the external memory configured to store counter values for each pixel to be processed, and the bus is a bi-directional bus configured to retrieve counter values from the external memory.

6. The apparatus of claim 1, further comprising the external memory configured to store complete counter values for each sub-pixel having a counter.

7. The apparatus of claim 1, wherein the fill rule indicates whether a sub-pixel is in a bounded region.

8. An apparatus for processing vector graphics primitives, the apparatus comprising:
a processor unit comprising:
counters configured to store a value indicating a current state of a fill rule for each of a sub-pixel sampling point for a pixel;
a first internal buffer configured to store at least one indicator bit value for each pixel, wherein said at least one indicator bit indicates status of the counters indicating the state of the fill rule and indicates whether to retrieve filling information from a second internal buffer;
the second internal buffer configured to store counter values; and
determination logic configured to determine whether or not to retrieve and to retrieve the counter value from the second internal buffer or from an external memory based on the indicator bit values;
the apparatus further comprising a unidirectional bus operatively coupled to the processor unit and configured to receive instructions and data.

9. The apparatus of claim 8, wherein the second internal buffer is configured to store a portion of the complete counter values.

10. The apparatus of claim 9, wherein the portion is a scan line.

11. The apparatus of claim 9, wherein the portion is a tile.

12. A graphics processing device, comprising:
a display;
an external memory;
a processing unit operatively coupled to the external memory for processing vector graphics primitives, including:
counters configured to store a value indicating a current state of a fill rule for each of a sub-pixel sampling point for a pixel,
a first internal buffer configured to store at least one indicator bit value for each pixel, wherein said at least one indicator bit indicates status of the counters indicating the state of the fill rule and indicates whether to retrieve limited counter values from a second buffer or complete counter values from the external memory, and
determination logic configured to determine whether or not to retrieve and to retrieve the counter value from the external memory or the second buffer based on the indicator bit values; and
a bus operatively coupled to the processing unit and the external memory.

13. The device of claim 12, wherein
the second buffer is an internal buffer configured to store limited values for each counter, and
the determination logic is further configured to determine whether or not to retrieve the limited counter values from the second buffer.

14. The device of claim 13, wherein the indicator bits of the first internal buffer include a value for indicating that a value of the counter has not changed.

15. The device of claim 13, wherein the indicator bits of the first internal buffer include a value for indicating that a value of the counter has to be retrieved from the external memory.

16. The device of claim 13, wherein the indicator bits of the first internal buffer include values for indicating a range of the second internal buffer from which the limited value of each counter is retrieved.

17. The device of claim 12, wherein the external memory is configured to store counter values for each pixel to be processed, and the bus is a bi-directional bus configured to retrieve counter values from the external memory.

18. The device of claim 12, further comprising the external memory configured to store complete counter values for each sub-pixel having a counter.

19. The device of claim 12, wherein the second internal buffer is configured to store a portion of the complete counter values.

20. The device of claim 19, wherein the portion is a scan line.

21. The device of claim 19, wherein the portion is a tile.

22. The device of claim 12, wherein the device comprises a handheld device.

23. A graphics processing device, comprising:
a display;
a processing unit for processing vector graphics primitives, including:
counters configured to store a value indicating a current state of a fill rule for each of a sub-pixel sampling point for a pixel,
a first internal buffer configured to store at least one indicator bit value for each pixel, wherein said at least one indicator bit indicates status of the counters indicating the state of the fill rule and indicates whether to retrieve filling information from a second internal buffer,
the second internal buffer configured to store limited counter values, and
determination logic configured to determine whether or not to retrieve and to retrieve the limited counter values from the second internal buffer based on the indicator bit values or complete counter values from an external memory; and
a unidirectional bus operatively coupled to the processing unit and configured to receive instructions and data.

* * * * *